United States Patent [19]
Willis et al.

[11] Patent Number: 5,646,627
[45] Date of Patent: Jul. 8, 1997

[54] METHOD AND APPARATUS FOR CONTROLLING A BIPHASE MODULATION TO IMPROVE AUTOCORRELATION IN PSEUDORANDOM NOISE CODED SYSTEMS

[75] Inventors: Carl Myron Willis, Mesa; Thomas Frederick Koehler, Scottsdale, both of Ariz.

[73] Assignee: Motorola, Inc., Schaumburg, Ill.

[21] Appl. No.: 593,962

[22] Filed: Jan. 30, 1996

[51] Int. Cl.$^6$ .................................................. G01S 7/28
[52] U.S. Cl. .................... 342/189; 342/145; 342/194; 342/203
[58] Field of Search .......................... 342/189, 21, 145, 342/194, 195, 203

[56] References Cited

U.S. PATENT DOCUMENTS

| | | | |
|---|---|---|---|
| 4,042,925 | 8/1977 | Albanese et al. | 342/132 |
| 5,084,901 | 1/1992 | Nagazumi | 375/204 |
| 5,120,997 | 6/1992 | Cantwell | 375/208 |
| 5,179,573 | 1/1993 | Paradise | 375/208 |
| 5,181,226 | 1/1993 | Cantwell | 375/200 |
| 5,293,168 | 3/1994 | Faulkner | 342/145 |
| 5,337,052 | 8/1994 | Lohrmann et al. | 342/68 |
| 5,497,160 | 3/1996 | Koehler et al. | 342/145 |
| 5,568,150 | 10/1996 | Taylor, Jr. et al. | 342/189 |

*Primary Examiner*—John B. Sotomayor
*Attorney, Agent, or Firm*—Bradley J. Botsch, Sr.

[57] ABSTRACT

This invention relates to a method and apparatus for controlling a biphase modulator (602, 702) to improve autocorrelation in pseudorandom noise coded systems. The biphase modulator modulates a carrier frequency with one of two phase states responsive to a pseudorandom noise (PN) binary code sequence. The spectrum (610, 710) at the output of the biphase modulator comprises a plurality of spectral lines separated by the code repetition frequency, including a center spectral line (611, 711) and at least one adjacent spectral line (612–615, 712–717). The magnitude of the center spectral line is measured and compared to a reference to produce a control signal which is responsive to the magnitude of the center spectral line. This control signal is supplied to the biphase modulator for maintaining a predetermined magnitude of the center spectral line thereby achieving a desired spectrum output and improving autocorrelation of the system.

19 Claims, 5 Drawing Sheets

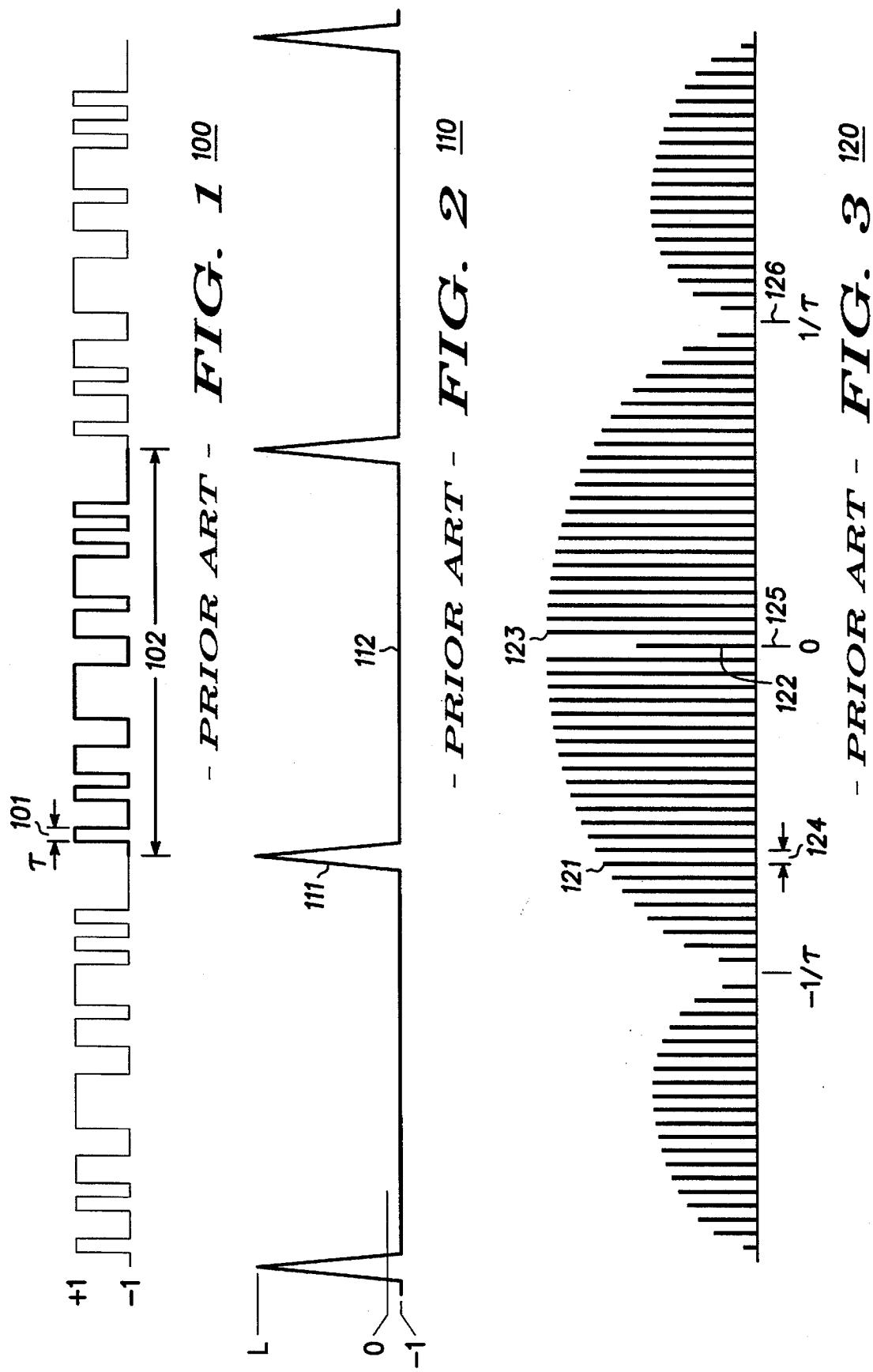

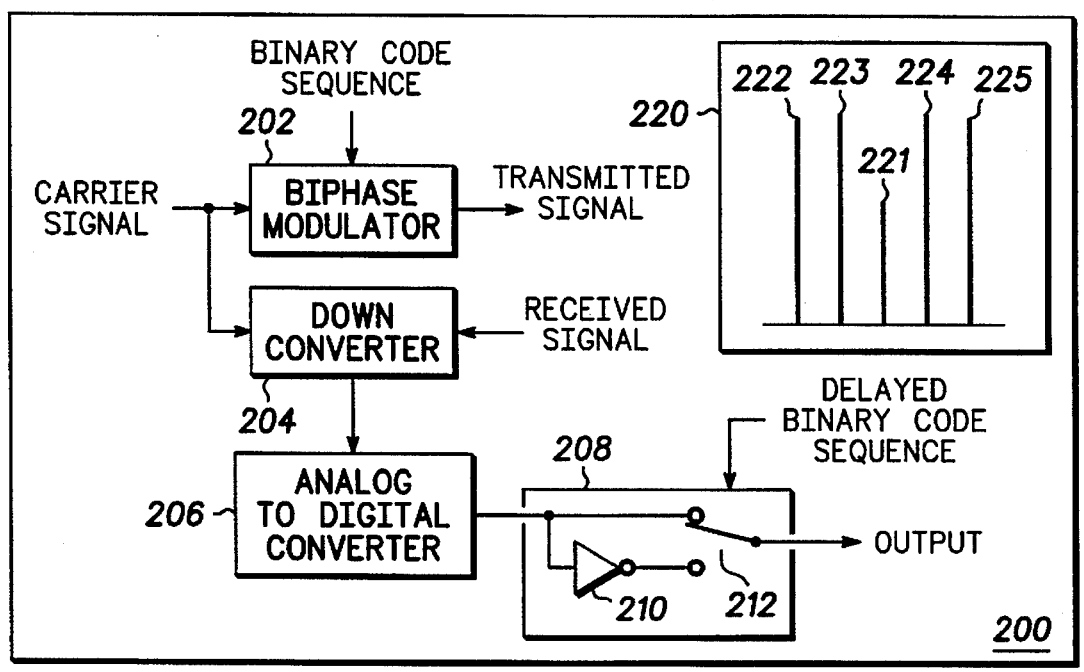
FIG. 4 - PRIOR ART -
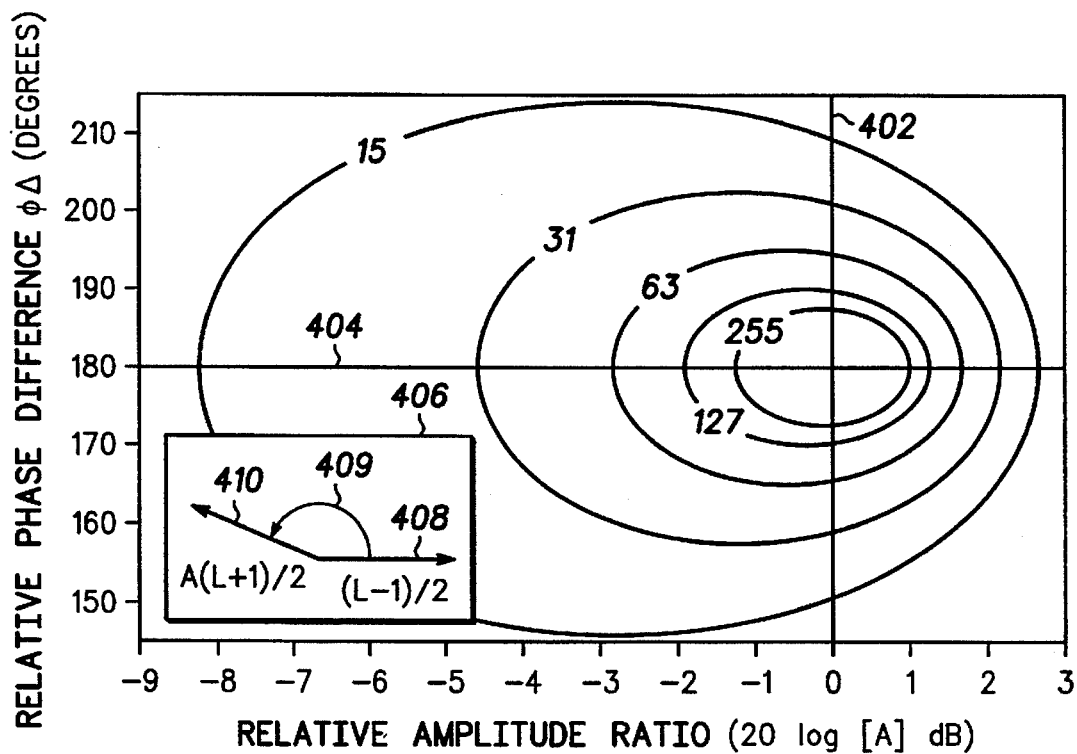
FIG. 6

METHOD AND APPARATUS FOR CONTROLLING A BIPHASE MODULATION TO IMPROVE AUTOCORRELATION IN PSEUDORANDOM NOISE CODED SYSTEMS

CROSS REFERENCE TO RELATED APPLICATIONS

This patent application relates to pending patent application having U.S. Ser. No. 08/123,508 entitled "METHOD AND APPARATUS FOR IMPROVED AUTO-CORRELATION AND RANGE CORRELATION IN PSEUDO-RANDOM NOISE CODED SYSTEMS" filed Sep. 17, 1993, and pending patent application having U.S. Ser. No. 08/593,103 entitled "METHOD AND APPARATUS FOR DIGITAL CORRELATION IN PSEUDO-RANDOM NOISE CODED SYSTEMS" filed concurrently herewith, both of which are assigned to the same assignee of the present application.

BACKGROUND OF THE INVENTION

This invention relates in general to the field of radar and communications systems, and in particular, to pseudorandom noise coded systems using biphase modulation for autocorrelation. In radar and communications systems, it is sometimes important to process signals having a desired range delay while rejecting signals having an undesired range delay. The autocorrelation performance, also referred to herein as the out-of-range rejection (ORR) performance, is a measure of such a systems ability to accomplish this requirement. Pseudorandom Noise (PN) coded systems are often used to achieve acceptable ORR performance while maintaining low peak transmit power requirements.

Most PN coded systems modulate the PN code onto a carrier frequency prior to transmission, and subsequently demodulate the PN code in the receive path in a correlation process. Conventional pseudorandom noise (PN) systems use a biphase modulator to modulate the characteristics of a maximal length binary code sequence onto the continuously transmitted carrier frequency. The biphase modulator has two phase states which are nominally separated 180 degrees in phase, and which are selected in response to the two output states of the binary code sequence. The phase difference between these two phase states is referred to as the relative phase difference while the amplitude difference between these two phase states is referred to as the relative amplitude ratio. By design, the relative amplitude ratio of the biphase modulator in a conventional PN system is desirably set to one, meaning that the amplitude of the signal at the output of the biphase modulator is desirably equal for the two different phase states. However, in such a conventional PN system, the ORR performance is limited, wherein it is proportional to the square of the PN code length. Thus, for a given PN code length, the ORR performance is fixed.

In designing a PN coded system (radar or communications) there is a system tradeoff to be made between the various waveform parameters such as the PN code length, PN code bit width, Doppler frequency band width, and transmitter center frequency. In a conventional PN system, the PN code length establishes the system's ORR performance, the PN code bit width establishes the system's range resolution, the Doppler frequency band width and the transmitter center frequency establish the maximum closing velocity. Moreover, for a given range resolution, closing velocity and transmitter center frequency, the PN code length and, consequently, the ORR performance is limited. Thus, this system tradeoff often results in a compromise between conflicting system requirements.

Accordingly, it is an aspect of the present invention to provide a significant improvement in the ORR performance of a system while maintaining the same or shorter PN code length. This would provide greater flexibility in selecting the PN modulation waveform parameters, and would allow for the simultaneous improvement of other performance parameters. In a PN radar system, for example, such a means would allow an increase in maximum target engagement velocity and/or an increase in the transmit frequency, while simultaneously improving the ORR performance. It would also provide a capability to detect very small targets in the presence of large out-of-range clutter return using a shorter PN code length.

It is also an aspect of the present invention to method of improving the ORR performance that allows for the adjustment of either the relative phase difference or the relative amplitude ratio, or both, of the two phase states of a biphase modulator. This will provide additional flexibility to more fully optimize the ORR performance.

It is still another aspect of the present invention to control the relative amplitude ratio between the two phase states of a biphase modulator by means of a feedback control loop to maintain a specific desired relative amplitude ratio offset slightly from one, while maintaining the relative phase difference desirably set to 180 degrees. In these applications less complex hardware may be required to demodulate the biphase modulated transmitted signal because phase information would not be necessary for demodulation, while still achieving improved ORR performance.

SUMMARY OF THE INVENTION

This invention relates to a method and apparatus for controlling a parameter of a biphase modulator to improve autocorrelation in pseudorandom noise coded systems. The biphase modulator modulates a carrier frequency with one of two phase states responsive to a pseudorandom noise (PN) binary code sequence. The PN binary code sequence is periodic. The spectrum at the output of the biphase modulator comprises a plurality of spectral lines separated by the code repetition frequency, including a center spectral line and at least one adjacent spectral line. The magnitude of the center spectral line is measured and compared to a reference to produce a control signal which is responsive to the magnitude of the center spectral line. This control signal is supplied to the biphase modulator which includes an element which is designed to adjust the value of an internal parameter responsive to the value of the control signal. The magnitude of the center spectral line is sensitive to the value of the parameter being controlled whereas the magnitude of the adjacent spectral lines are relatively insensitive to the value of the parameter being controlled. Thus, the magnitude of the center spectral line varies, responsive to the value of the parameter being controlled, and provides a measure of its value.

The present invention implements a feedback control loop to improve the autocorrelation of a PN coded system including a biphase modulator having an element which adjusts the value of an internal parameter responsive to a control signal, and a control signal generator which measures the magnitude of the center spectral line and adjusts the value of the control signal to achieve a desired value for the parameter being controlled as indicated by the magnitude of the center spectral line. Appropriate internal parameters of the biphase modulator to be controlled include the relative phase difference and the relative amplitude ratio.

BRIEF DESCRIPTION OF THE DRAWINGS

A more complete understanding of the present invention may be derived by referring to the detailed description and claims when considered in conjunction with the drawings, wherein like reference numbers refer to similar items throughout the drawings; and FIGS. 1–3 are pictorial diagrams illustrating well known properties of a maximal length binary code sequence;

FIG. 4 is a detailed block diagram illustrating a typical PN radar system;

FIG. 6 is a graphical diagram illustrating a family of curves describing desired values for the relative phase difference and relative amplitude ratio of a biphase modulator;

DETAILED DESCRIPTION OF THE DRAWINGS

Figure 5:
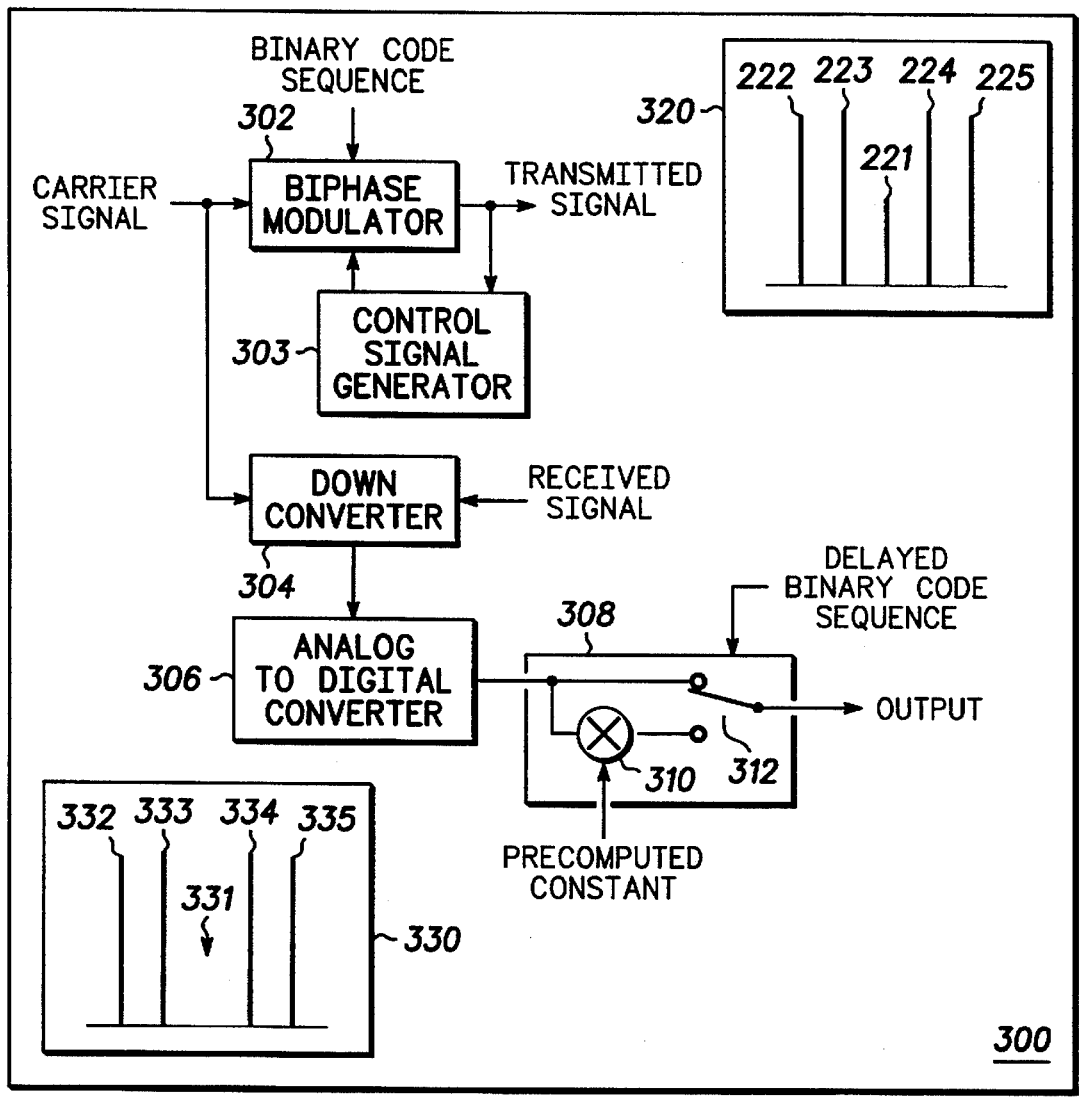
FIG. 5 is a detailed block diagram illustrating a PN radar system in accordance with the present invention.

Referring to FIGS. 1–3, properties of a maximal length binary code sequence, as is well understood in the art, are illustrated. Maximal length binary code sequences have approximately the same statistical properties as randomly generated binary code sequences and are referred to in the literature by various names depending on their use wherein the terms maximal length binary code sequence, pseudorandom noise code sequence, PN code sequence, PN binary code sequence, PN code, and the like as used herein are synonymous.

FIG. 1 illustrates a maximal length PN code sequence 100 having a code length, L, of 31, for example. The code length of a maximal length PN code sequence is limited to integers satisfying the equation, $L=2^N-1$ where N is a positive integer. The PN code bit width, $\tau$, (101) and the code repetition interval, $CRI=L\tau$, (102) have units of time.

FIG. 2 illustrates the autocorrelation 110 of the PN code sequence 100 of FIG. 1. Autocorrelation 110 has a normalized peak response 111 equal in magnitude to the PN code length, L, at relative delays where the PN code correlates with itself, and has a value equal to negative 1 relative to the normalized peak response at all other delays in the autocorrelation function representing the uncorrelated region 112 shown.

FIG. 3 illustrates the power spectrum 120 of the PN code sequence which can be found using the Wiener-Khinchin theorem which states that the power spectrum of a wide-sense stationary process is the Fourier transform of its autocorrelation function. Spectrum 120 has a number of spectral components 121 which follow a $\sin^2 x/x^2$ envelope except for the center spectral line 122 which is the DC component located at zero frequency 125. The power of the center spectral line 122, relative to the total power in the PN code sequence normalized to one power unit, is equal to $10 \log(1/L^2)$ dB, whereas the power of the $\sin^2 x/x^2$ envelope at zero frequency, relative to the total normalized power, is equal to $10 \log(1/L)$ dB. Thus, the magnitude of the center spectral line 122 is less than the magnitude of a spectral line immediately adjacent to it 123 which follows the $\sin^2 x/x^2$ envelope. The spectral lines are separated in frequency by the code repetition frequency, $CRF=1/L\tau$, (124) and have a first null located in frequency at $1/\tau$ (126). These time and frequency waveforms reappear often in a conventional PN coded system as will become apparent hereinafter.

Referring to FIG. 4, a block diagram of a typical PN radar system 200 is shown. The system 200 includes biphase modulator 202 that is used to modulate the characteristics of the binary code sequence, similar to one shown in FIG. 1, onto a carrier signal supplied to an input of the biphase modulator. Biphase modulator 202 provides one of two different phase states having a relative phase difference of 180 degrees onto the carrier signal depending on the code state of the input binary PN code sequence. Typically, an amplitude imbalance between the two different phase state signals appearing an output of biphase modulator 202 is undesirable wherein the relative amplitude ratio between the two phase states is desirably unity.

The spectrum 220, shown in FIG. 4, of the transmitted signal at the output of biphase modulator 202 takes the form of the characteristic spectrum of the PN code sequence 120, shown as FIG. 3, except that the spectrum 220 will be centered such that the center spectral line 221 is positioned at the carrier frequency, $f_o$, rather than at zero frequency. Spectrum 220 shows only a few of the spectral lines 222–225 immediately adjacent to the center spectral line 221 for simplicity, but it is understood that the spectral components of frequency spectrum 220 follow the $\sin^2 x/x^2$ envelope in a similar manner as did spectrum 120 of FIG. 3.

There are a plurality of methods for demodulating the received signal in a range correlation process. FIG. 4 illustrates an exemplary method for demodulating the received signal at baseband using a digital correlator 208. The received signal is down converted to baseband by a down converter 204 followed by an analog to digital converter 206 which digitizes the biphase modulated baseband signal to produce a sampled data word. The inverter 210 negates the value of the sampled data word, for example by inverting the sign bit, and presents both the sampled data word and its negative to the multiplexer 212. The multiplexer 212 selects either the sampled data word or its negative depending on the state of the binary code sequence. This multiplexing process effectively multiplies the sampled data word by either +1 or −1 depending on the state of the binary code sequence. Multiplying by a +1 or a −1 digitally simulates a biphase demodulator having a relative phase difference of 180 degrees and a relative amplitude ratio of unity.

It is noteworthy that for the PN radar system of FIG. 4, the spectrum 220 appears as shown at several locations including (i) the output of the biphase modulator 202, in which case the center spectral line 221 is positioned at the carrier frequency $f_o$, (ii) the received signal input to the down converter 204, in which case the center spectral line 221 is positioned at the Doppler shifted frequency, $f_o+f_d$, and (iii) the output of the down converter 204, in which case the center spectral line 221 is positioned at the Doppler frequency, $f_d$. In operation, for a target positioned at a correlated range delay, the spectrum appearing at the output of the multiplexer 212 appears as a single spectral line positioned at the Doppler frequency, $f_d$. However, for a target positioned at an uncorrelated range delay, the spectrum at the output of the multiplexer 212 takes the form of spectrum 220 in which case the center spectral line 221 is positioned at the Doppler frequency, $f_d$. The output of the multiplexer 212 is typically followed by a filter, not shown, designed to pass the energy in the center spectral component while rejecting the energy in the plurality of spectral components adjacent to the center spectral component. Accordingly, in such a PN radar such as shown in FIG. 4, the ORR performance is limited by the magnitude of the center spectral line in which the center spectral line 221 has a magnitude of 10 log($^1$/L$^2$) dB. As an example, for a code length, L, equal to 255, the ORR performance would be limited to −48 dB for such a system and no better ORR performance could be achieved.

However, the present invention provides a method and technique for achieving significantly improved ORR performance for a fixed code length and further provides a method for obtaining theoretically perfect ORR performance for any code length. The present invention is related to the subject matter disclosed in already allowed U.S. patent application having Ser. No. 08/123,508 entitled "METHOD AND APPARATUS FOR IMPROVED AUTO-CORRELATION AND RANGE CORRELATION IN PSEUDO-RANDOM NOISE CODED SYSTEMS" with a common inventor and assigned to the same assignee as the present application, the subject matter of which is incorporated by reference herein, which discloses a method for improving the ORR performance by intentionally offsetting the relative phase difference of the biphase modulator 202 by an amount as calculated in EQN. 1.

$$\phi_\Delta = \pi \pm \cos^{-1}\left[\frac{L-1}{L+1}\right] \qquad \text{EQN. 1}$$

where $\Phi\Delta$ is the relative phase difference; and

L is the PN code length; and wherein A, the relative amplitude ratio, is understood to be desirably equal to 1.

This referenced patent discloses several variations of an apparatus and method for controlling the value of $\Phi\Delta$ by means of a feedback control loop, to achieve and maintain a desired value of $\Phi\Delta$ in the neighborhood of the value calculated by EQN. 1 which results in improved ORR performance.

The present invention relates to a more general method and apparatus for improving the ORR performance by means of a feedback control loop wherein a more generalized parameter within the biphase modulator 202 is controlled in a manner oblivious as to which parameter is controlled. A detailed block diagram shown in FIG. 5 illustrates an embodiment of the present invention as implemented in a PN radar 300 that is similar to the PN radar system shown in FIG. 4. The present invention includes biphase modulator 302 having a component therein for adjusting a generalized parameter value in response to a control signal, such as a voltage or current control signal. Typical parameters of the biphase modulator that may be adjusted include the relative phase difference, $\Phi\Delta$, and the relative amplitude ratio. An example of a biphase modulator having an internal parameter which may be adjusted in response to an externally applied control signal is disclosed in detail in U.S. Pat. No. 5,442,327, issued on Aug. 15, 1995, entitled "MMIC Tunable Biphase Modulator", and assigned to the same assignee as the present application, the subject matter of which is incorporated by reference herein.

Perfect ORR may be achieved based upon the following theory. By reversing the logic of the Wiener-Khinchin theorem, one may postulate that if perfect autocorrelation were to be achieved by modifying the attributes of the biphase modulator 320, then one might expect the spectrum 320, appearing at the output of the biphase modulator 302, to take the form of the Fourier Transform of a perfect autocorrelation function as a result of those modifications. The spectrum expected, given the periodicity of the binary code sequence, is a plurality of spectral lines 320 including a center spectral line 321 which all follow the $\sin^2 x/x^2$ envelope.

Similar to the system shown in FIG. 4, spectrum 320 appears as shown at several locations within system 300 including (i) the output of the biphase modulator 302, in which case the center spectral line 321 is positioned at the carrier frequency $f_o$, (ii) the received signal input to the down converter 304, in which case the center spectral line 321 is positioned at the Doppler shifted frequency, $f_o+f_d$, and (iii) the output of the down converter 304, in which case the center spectral line 321 is positioned at the Doppler frequency, $f_d$. Moreover, as aforedescribed, for a target positioned at a correlated range delay, the spectrum at the output of the multiplexer 312 appears as a single spectral line positioned at the Doppler frequency, $f_d$. However, for a target positioned at an uncorrelated range delay, the spectrum at the output of the multiplexer 312 takes the form similar to the spectrum 330, in which case the center spectral line 331 is positioned at the Doppler frequency, $f_d$, and is significantly attenuated (theoretically infinitely attenuated). The output of the multiplexer 312 may be followed by a filter, not shown, designed to pass the energy in the significantly attenuated center spectral component while rejecting the energy in the plurality of spectral components adjacent to the attenuated center spectral component. Therefore, the ORR performance of the system of the present invention is not limited to 10 log($^1$/L$^2$) dB as was the case with the system of FIG. 4. Rather, perfect ORR performance for the system of the present invention may be theoretically approached for any code length. This assumes that the received signal is appropriately demodulated. More particularly for the preferred embodiment of FIG. 5, the center spectral line 331 is significantly attenuated if the value of the precomputed constant is chosen properly as will be explained later.

The magnitude of the center spectral line 321 is observed to be sensitive to various parameters of the biphase modulator 302 including the values of the relative phase difference and the relative amplitude ratio, whereas the magnitudes of the adjacent spectral lines 323 through 325 are insensitive to these parameter values. Since the desired spectral condition resulting in improved ORR performance is such that the magnitude of the center spectral line is relatively large, being equal to the peak of the $\sin^2 x/x^2$ envelope, then a control loop to maintain the desired spectral condition by adjusting the value of an internal parameter may be practically implemented in that the effect of the parameter value being controlled may be made to dominate over other parameters affecting the magnitude of the center spectral line.

It does not necessarily follow that any modification to parameters of the biphase modulator 302 resulting in a spectrum 320 approximating this criteria result in improved ORR performance. However, it has been found that some parameters taken individually, or in combination, do result in improved ORR performance including such parameters as the relative phase difference, $\Phi\Delta$, and the relative amplitude ratio, A. The desired spectral condition may be approximated by either 1) adjusting the value of the relative phase difference, $\Phi\Delta$, of the biphase modulator 302 while maintaining the relative amplitude ratio, A, near 1; or 2) adjusting the value of the relative amplitude ratio, A, of the biphase modulator 302 while maintaining the relative phase difference, $\Phi\Delta$, near 180 degrees; or 3) adjusting both the value of the relative amplitude ratio, A, and the value of the relative phase difference, $\Phi\Delta$, in combination, to achieve the desired spectral condition at the output of biphase modulator 302. Accordingly, theoretically perfect ORR performance may then be approached.

In particular, the biphase modulator 302 in the transmit path may be designed and operated to purposely offset either the relative phase difference from 180 degrees or the relative amplitude ratio from unity, or both, by the proper amount as indicated by observable characteristics of the spectrum at the output of the biphase modulator 302. The equation which solves for all the combined values producing such a spectrum is expressed as shown in EQN. 2.

$$\phi_\Delta = \pi \pm \cos^{-1}\left[\frac{A^2(L+1)^2 + (L^2 - 6L + 1)}{2A(L^2 - 1)}\right] \quad \text{EQN. 2}$$

$$\text{where } \frac{(L-1) - 2\sqrt{L}}{L+1} \leq A \leq \frac{(L-1) + 2\sqrt{L}}{L+1};$$

$\phi_\Delta$ is the relative phase difference;
A is the relative amplitude ratio; and
L is the PN code length.

The definition of the value of A, used in EQN. 2, must be explained. All maximal length PN code sequences have an odd numbered integer code length, L. The properties of the PN code sequence are such that the number of occurrences of each of the two binary code states differ by exactly 1 over a complete code period. That is, one of the two code states, defined here as the excess code state, occurs (L+1)/2 times, and the other code state, defined here as the deficient code state, occurs (L-1)/2 times. A is defined as the peak sine wave voltage amplitude at the output of the biphase modulator when the excess code state is exercised, divided by the peak sine wave voltage amplitude when the deficient code state is exercised.

Turning now to FIG. 6, a family of curves describing the desired values for the biphase modulator 302 relative phase difference, $\phi_\Delta$, shown as reference number 409, and relative amplitude ratio, A, for solving EQN. 2 is shown. Representative curves are shown for maximal length PN code sequences having lengths, L, of 15, 31, 63, 127, and 255. The values for the relative phase difference is given in degrees along the vertical axis 402, and the values for the relative amplitude ratio expressed in decibels as 20 log(A) is given along the horizontal axis 404. Block 406 depicts the two phase and amplitude states of the biphase modulator. The convention arbitrarily chosen is to place the vector sum of the (L-1)/2 occurrences 408 of the deficient PN code state along the positive real axis, and then the vector sum of the (L+1)/2 occurrences 410 of the excess PN code state is shown relative to it.

In a preferred embodiment, the biphase modulator 302 is designed such that either, 1) the relative amplitude ratio is desirably fixed at 1 (0 dB) with a component to control the value of the relative phase difference responsive to an externally applied control signal, or 2) the relative phase difference is desirably fixed at 180 degrees with a component to control the value of the relative amplitude ratio responsive to an externally applied control signal. These two cases lie along the vertical axis 402 and along the horizontal axis 404, respectively. Accordingly, if the decision is made to fix either the relative phase difference at 180 degrees or the relative amplitude ratio to unity, the desired value for the non-fixed parameter for achieving theoretically perfect ORR performance may be obtained from FIG. 6. For example, if the relative phase difference is fixed at 180 degrees and the code length is 31, then the relative amplitude ratio should be adjusted to either 2.2 dB or -4.6 dB, in order to achieve theoretically perfect ORR performance. However, it is understood that the relative phase difference need not be set at 180 degrees, or the relative amplitude ratio need not be set to unity (0 dB) in order to use the chart of FIG. 6 solving EQN. 2. As a practical example, the relative phase difference may be desirably fixed at 180 degrees or alternatively, the relative amplitude ratio may be desirably fixed at 1, but due to manufacturing tolerances, the desired value of the fixed parameter of the biphase modulator 202 may not actually be realized. In this case, EQN.2 and the corresponding curves of FIG. 6 may be used to compensate for these imperfections by properly choosing the value of the precomputed constant 311 as will be explained later.

Figure 7:
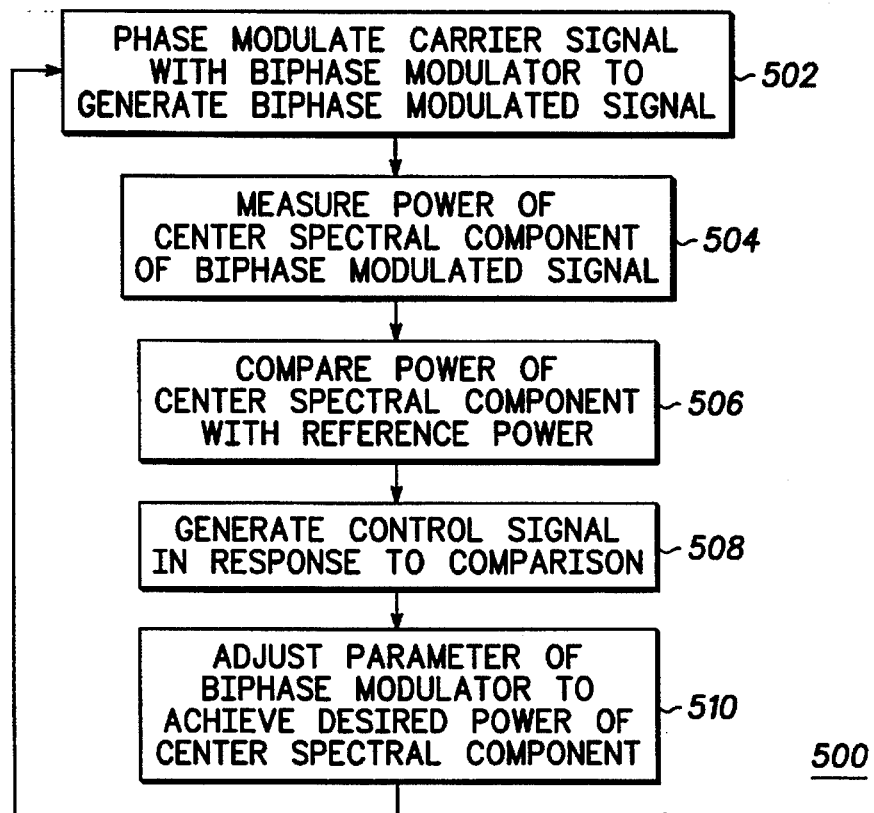
FIG. 7 illustrates a flow chart of a procedure for adjusting a parameter of a biphase modulator to achieve improved ORR performance in accordance with the present invention.

FIG. 7 illustrates a flow chart 500 of a method and procedure for adjusting a generalized parameter of a biphase modulator (for example 302) in a PN coded system (for example 300) and for maintaining a desired value of the generalized parameter by means of a feedback control loop thereby improving the ORR performance of the PN coded system in accordance with the present invention. Block 502 comprises the step of phase modulating a carrier signal by utilizing a biphase modulator that is responsive to a binary PN code sequence thereby generating a biphase modulated signal. The power spectrum of the resulting biphase modulated signal comprises a plurality of spectral components including a center spectral component and a plurality of adjacent spectral components. The biphase modulator includes a parameter whose value is responsive to an externally applied control signal. The power in the center spectral line is responsive to the value of the parameter. Preferably, the parameter is either the relative phase difference or the relative amplitude ratio.

Block 504 comprises the step of measuring the power in the center spectral component. In a preferred embodiment the power spectrum at the output of the biphase modulator is sampled and down converted to base band where the power in the center spectral component can more easily be measured. Preferably, the power in the center spectral component is measured by filtering the signal such that the center spectral component is within the pass band of the filter and the adjacent spectral components are in the stop band and are thereby rejected by the filter. More particularly, in a preferred embodiment of the present invention, the base band signal is digitized using an analog to digital converter, and then a digital filter of conventional digital design is used to measure the power in the center spectral component.

Block 506 comprises the step of comparing the power in the center spectral component with a reference power. The reference power is proportional to the power in an adjacent spectral component. This may be determined by a variety of means. Since the power in the adjacent spectral components is relatively constant whereas the power in the center spectral component is sensitive to change, then the reference power may be taken as an arbitrary constant. Alternatively, the reference power may be proportional to the power measured in a plurality of spectral components including the center spectral component and at least one adjacent spectral component. Preferably, the reference power is determined by measuring the power in at least one of the plurality of adjacent spectral components not including the center spectral component. More particularly, in a preferred embodiment of the present invention, the reference power is determined by measuring the power in a single spectral component immediately adjacent to the center spectral component by means of a digital filter.

Block 508 comprises the step of generating the control signal that is externally applied to the biphase modulator, responsive to the comparison of the power in the center spectral component with the reference power. Preferably, the control signal is a control voltage. More particularly, in a preferred embodiment of the present invention, the control signal is formed by a digital to analog converter which receives a digital word whose value is computed based on the comparison of the power measured in the center spectral component with the reference power formed as the power measured in an adjacent spectral component. Preferably, a ratio is computed between the power measured in the center spectral component and the power measured in an adjacent spectral component, which is compared to a desired ratio corresponding to the desired power spectrum resulting in improved ORR performance. An error signal may be formed which is used to compute a change in the present value of the control signal which will effect a change in the power spectrum closer to the desired power spectrum thereby reducing the value of the error signal.

Block 510 comprises the step of adjusting the value of the parameter of the biphase modulator responsive to the value of the externally applied control signal to achieve a desired power of the center spectral component resulting in improved ORR performance. The resulting feedback control loop thus achieves and maintains a condition of the biphase modulator and biphase modulated signal which approaches perfect ORR performance.

Figure 8:
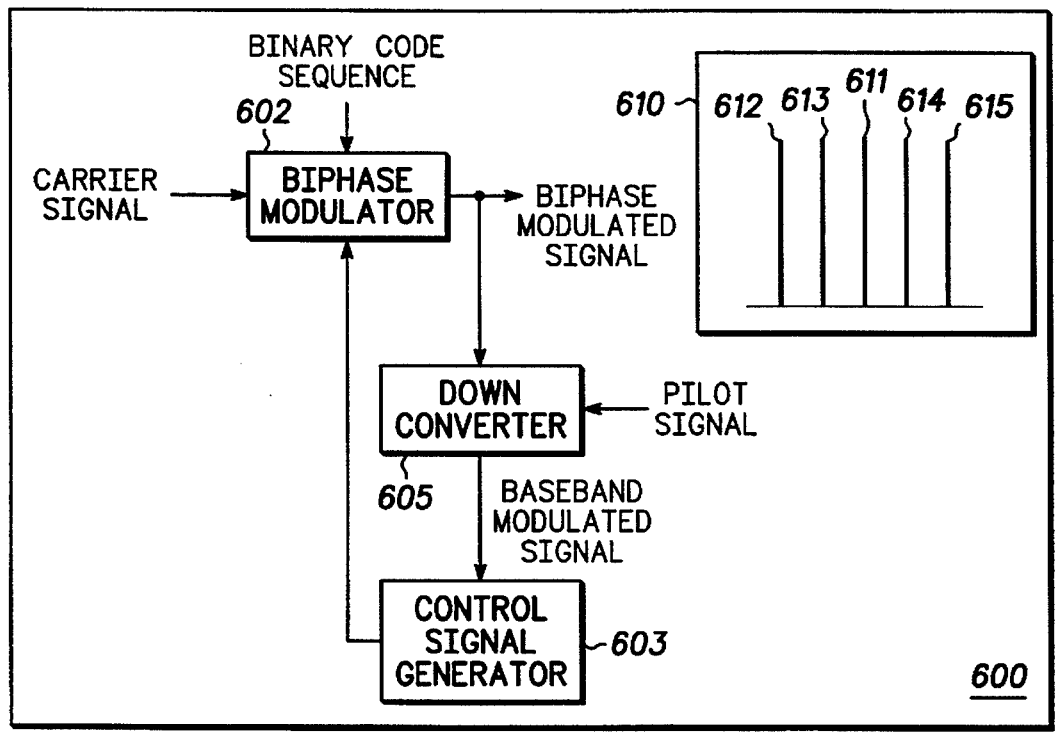
FIG. 8 is a detailed block diagram illustrating a feedback control circuit including a control signal generator in accordance with the present invention.

Referring to FIG. 8, a detailed block diagram illustrating a feedback control loop incorporating biphase modulator 602 for adjusting a parameter of modulator 602 is shown. As discussed above, this invention typically applies to systems which transmit a carrier signal that is phase modulated with the characteristics of a binary PN code sequence. The biphase modulator includes a component(s) which adjusts a generalized parameter, preferably either the relative phase difference or the relative amplitude ratio of the two phase states, in response to a control signal from control signal generator 603. Preferably, the control signal is a control voltage.

The control signal generator 603 measures the power in the center spectral component 611 of the baseband spectrum 610. The down converter 605 shifts the power spectrum appearing at the output of the biphase modulator 602 to baseband where the power in the center spectral component 611 is more easily measured. The pilot signal at the input of the down converter 605 is preferably a sine wave having a frequency slightly offset from the frequency of the carrier signal at the input of the biphase modulator 602. The pilot signal at the input of down converter 605 may be produced using one of a variety of well known means including a single side band modulator in which the carrier signal at the input of the biphase modulator 602 is single side band modulated with an offset modulation frequency preferably less than one half the code repetition frequency of the binary code sequence at the input of biphase modulator 602. The power in the center spectral component may be compared with a known reference power to generate the control signal for adjusting the value of the controlled parameter in the biphase modulator to achieve the desired spectrum at the biphase modulator output. The desired spectrum being one similar to the spectrum shown in FIG. 5, except that the amplitude of the center spectral component is adjusted to follow the $\sin^2 x/x^2$ envelope to approach perfect ORR performance.

Alternately, the power in the center spectral component may be compared with the power in one or more of the adjacent spectral components, such as spectral components 613 and 614, to generate the control signal for adjusting the value of the controlled parameter in the biphase modulator 602 to achieve the desired spectrum at the biphase modulator output. In a preferred embodiment of the present invention the controlled parameter in the biphase modulator 602 effects the value of either the relative phase difference or the relative amplitude ratio. The receiver, not shown in FIG. 8 but an exemplary one is shown in FIG. 5, includes a means for demodulating the received biphase modulated signal, using the same values of relative phase difference and relative amplitude ratio as in the transmit biphase modulator to achieve improved autocorrelation.

Figure 9:
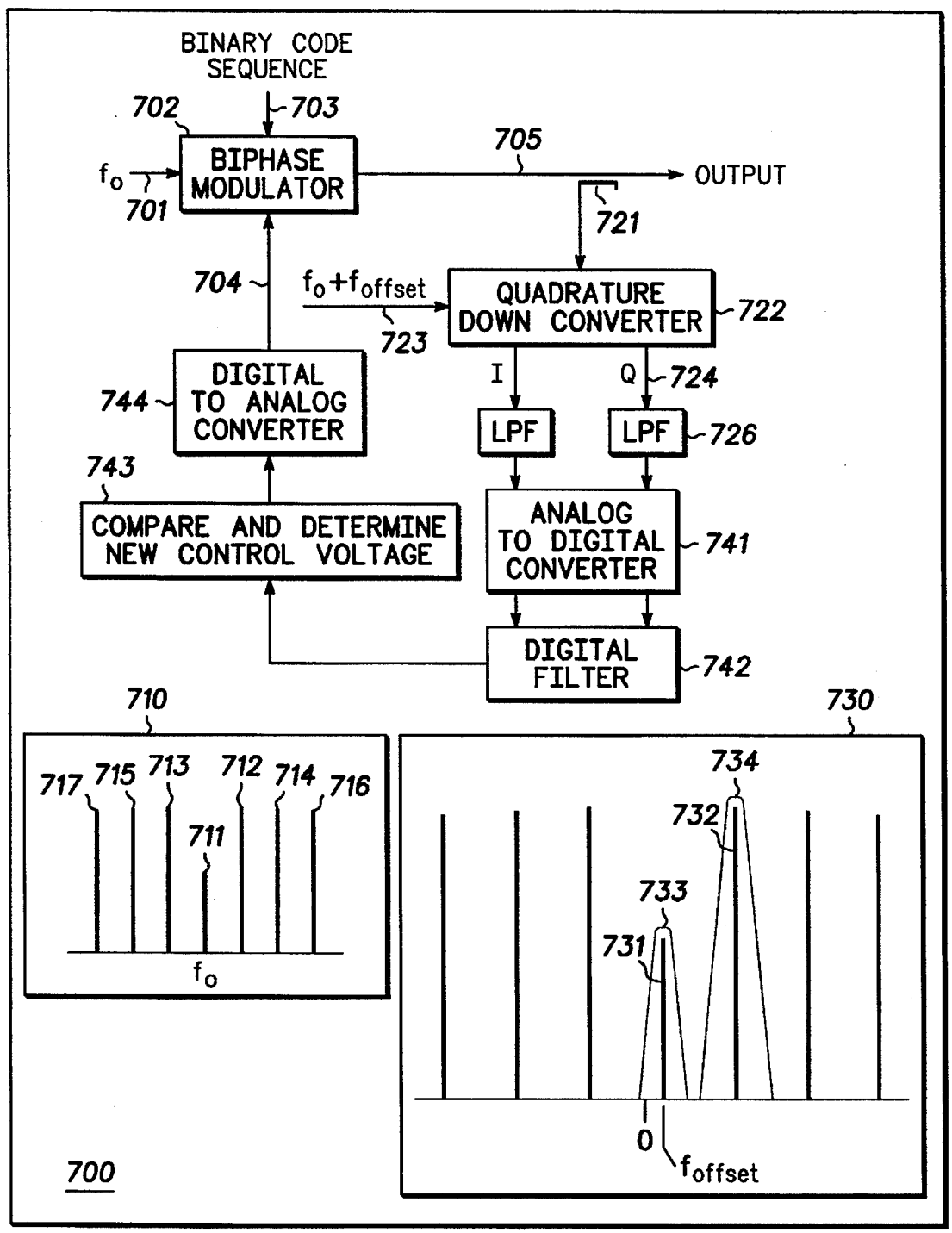
FIG. 9 is a detailed block diagram illustrating a preferred embodiment of the control signal generator of FIG. 6.

As shown in FIG. 8, generator 603 is utilized within a feedback control circuit/loop for adjusting the control signal supplied to the biphase modulator for varying the value of a controlled parameter in the biphase modulator to achieve the desired spectrum at the biphase modulator output thereby improving the ORR performance. However, many techniques and methods for implementing control signal generator 603 are possible. For example, referring to FIG. 9, a detailed block diagram 700 illustrating a preferred embodiment of the control signal generator 603 is shown. Biphase modulator 702 modulates the characteristics of a binary PN code sequence 703 onto a carrier frequency, $f_o$, (701) by effecting one of two discrete phase states depending on the state of the binary PN code, to produce a biphase modulated sine wave at the biphase modulator output 705. As discussed above, for a PN system in which the relative amplitude and relative phase is balanced, i.e., the relative amplitude ratio is set to unity and relative phase difference is set to 180 degrees, the power spectrum 710 of the modulated PN code appearing at the biphase modulator output 705 takes the form of the characteristic PN code spectrum previously shown as FIG. 3, except that the center spectral component 711 is centered at the carrier frequency, $f_o$, rather than at zero frequency. Again, only a few of the spectral components near the center are shown in FIG. 9 for convenience.

It has been shown that the magnitude of the center spectral component 711 is sensitive to the relative amplitude ratio and the relative phase difference of the biphase modulator and does not, in general, follow the $\sin^2 x/x^2$ envelope. On the contrary, the magnitude of the spectral components adjacent to the center spectral component, 712 through 717, are insensitive to the relative amplitude ratio and the relative phase difference and nicely follow the $\sin^2 x/x^2$ envelope. In the present invention, however, either the relative amplitude ratio or the relative phase difference, or both, are desirably and purposely unbalanced by design to achieve an improvement in ORR performance. To that end, the present invention samples the power spectrum 710 appearing at the output of biphase modulator 705. A means for down converting the power spectrum to baseband while preserving phase information is provided by a quadrature down converter 722. Converter 722 has two inputs, a first input being the sampled spectrum 721 and a second input being a pilot signal 723. Preferably, the pilot signal is a sine wave whose frequency is offset slightly from the carrier frequency, $f_o$, by a desired frequency offset, $f_{offset}$, preferably less than one half the code repetition frequency, CRF.

The quadrature down converter 722 has two output signals 724, comprising a first output signal commonly referred to an in-phase or I signal, and a second output signal commonly referred to as a quadrature or Q signal. The I and Q signals at the output of the quadrature down converter 724 are preferably, though not essentially, filtered by low pass filters 726 prior to being digitized by analog to digital converter 741. The spectrum 730 of the complex I and Q signals appearing at the output of the quadrature down converter 722 is shown in FIG. 7 and takes the form of the spectrum appearing at the output biphase modulator 710, except that the center spectral line 731 is centered at the offset frequency, $f_{offset}$.

The digitized complex I and Q signals at the output of the analog to digital converter 741 are sent to a digital computing means comprising digital filter 742, compare circuitry 743 and digital to analog converter 744. The digital filter includes a means for measuring the power in the center spectral component 731, preferably using a Discrete Fourier Transform (DFT) 733 having a DFT kernel centered at the frequency of the center spectral component 731, $f_{offset}$, and a means for determining a reference power level, which may be a supplied reference power signal or may be a means for measuring the power in a subset of the adjacent spectral components, and more particularly by using a DFT 734 which measures the power in the spectral component immediately adjacent to the center spectral component 732 which is centered at a frequency equal to a sum of the offset frequency, $f_{offset}$, and the code repetition frequency, CRF.

The digital computing means also includes a means for comparing the measured power in the center spectral component to the reference power level, and for determining a resultant digital control value 743 which is supplied to digital to analog converter 744 for converting the resultant digital control value to an analog control voltage wherein this analog control voltage provides an external control voltage signal to an input 704 of the biphase modulator 702 to vary an interval parameter of the biphase modulator, preferably either the relative phase difference or the relative amplitude ratio.

Biphase modulator 702 includes a component which adjusts either the relative phase difference or the relative amplitude ratio in response to the externally applied control signal so that a desired value may be achieved whereby one implementation of modulator 702 that is responsive to an externally applied control signal is disclosed in U.S. Pat. No. 5,442,327, as mentioned above. It has been determined that the desired condition for the values of the relative amplitude ratio and the relative phase difference to improve ORR performance is indicated by a power spectrum 710 having a center spectral component 711 which also follows the $\sin^2 x / x^2$ envelope resulting in a magnitude which is approximately equal to the immediately adjacent spectral component 712, and which, by symmetry, is also approximately equal in magnitude to the immediately adjacent spectral component 713.

Perfect ORR performance for the present invention may be theoretical approached assuming that the received signal is appropriately demodulated. Referring back to FIG. 5, a plurality of methods may be used to demodulate the receive signal in a PN system which implements this invention to improve ORR performance. For example, the received signal may be demodulated at RF using a biphase modulator with a control loop implemented according to the present invention.

Preferably, the received signal is demodulated using a digital correlator 308 as shown in FIG. 5. Down converter 304 down converts the received signal to baseband where it is digitized by analog to digital converter 306. The digitized received signal is presented as an input to a multiplexer 312 and is also multiplied times a precomputed constant 311 by multiplier 310. The output of the multiplier 310 is presented as a second input to the multiplexer 312 which selects as an output either the digitized received signal or the product of the digitized received signal multiplied times the precomputed constant depending on the state of the binary code sequence. More particularly for the preferred embodiment of FIG. 5, the center spectral line 331 is significantly attenuated corresponding to improved ORR performance if the value of the precomputed constant is chosen properly. The precomputed constant is, in general, a complex number calculated in EQN 3.

$$\text{Precomputed Constant} = A \cos(-\Phi\Delta) + j A \sin(-\Phi\Delta) \quad \text{EQN. 3}$$

where $\Phi\Delta$ is the value of the relative phase difference; and

A is the value of relative amplitude ratio realized by the biphase modulator 302 to achieve and maintain the desired spectrum 320 using the feedback control loop of the present invention.

Preferably, the values of $\Phi\Delta$ and A are determined empirically by measuring the ORR performance in an automated test sequence, recognizing that the parameter values will closely approximate EQN. 2 and the curves shown as FIG. 6. Alternatively, at least one of the two parameters may be determined through measurement or by manufacturing specification with the remaining controlled parameter being determined from EQN. 2.

The preferred method of demodulating the received signal is to implement the down converter 304 as a quadrature down converter providing separate in-phase, I, and quadrature, Q, signals, which are then digitized using an analog to digital converter 306. The digitized biphase modulated received signal is subsequently range correlated by either accepting the I and Q signals unmodified or by accepting the product of the complex I and Q signals and a complex constant 311 appearing at the output of multiplier 310, depending on the state of the delayed binary PN code sequence.

For applications which emphasize economy of hardware complexity, the biphase modulator 302 may be operated at a point along the horizontal axis 404 wherein the relative phase difference is desirably equal to 180 degrees, then from EQN. 3 the precomputed constant is approximately equal to −A. In this case the down converter 304 may be implemented as a real mixer having only a single real value, and multiplier 310 is a real multiplier rather than a complex multiplier.

While the invention has been described in conjunction with specific embodiments thereof, many alternatives, modifications and variations will be apparent to those of ordinary skill in the art in light of the foregoing description. Accordingly, the invention is intended to embrace all such alternatives, modifications and variations as fall within the spirit and broad scope of appended claims.

We claim:

1. A method for improving autocorrelation and enhancing out of range rejection (ORR) in a pseudorandom noise (PN) coded system that uses biphase modulation by controlling a parameter associated with a biphase modulator, comprising the steps of:

phase modulating a carrier signal with a binary PN code sequence thereby generating a biphase modulated signal;

obtaining a measure of power of a center spectral component of said biphase modulated signal;

comparing said power measured in said center spectral component with a reference power;

generating a control signal in response to said comparison for use in adjusting a parameter of said biphase modulator thereby achieving a desired power spectrum for said biphase modulated signal for improving autocorrelation of the PN coded system.

2. The method according to claim 1 wherein said step of generating a control signal includes using said control signal for adjusting a relative phase difference between the two states of said biphase modulated signal.

3. The method according to claim 1 wherein said step of generating a control signal includes using said control signal for adjusting a relative amplitude ratio between the two states of said biphase modulated signal.

4. The method according to claim 1 further including the step of obtaining a measure of power of at least one spectral component of said biphase modulated signal that is adjacent to said center spectral component and wherein the magnitude of said reference power comprises power measured in said at least one spectral component.

5. The method according to claim 4 wherein the step of obtaining a measure of power in said center spectral component and in said at least one spectral component includes the steps of:

filtering in-phase and quadrature components of said baseband signal;

digitizing said filtered in-phase and quadrature components of said baseband signal; and obtaining a discrete Fourier transform of said digitized in-phase and quadrature components of said baseband signal.

6. The method according to claim 1 further including the step of down converting said biphase modulated signal to a baseband signal.

7. A pseudorandom noise (PN) coded system utilizing a biphase modulator for improving autocorrelation and for enhancing out of range rejection of the system by controlling a parameter associated with the biphase modulator, comprising:

a biphase modulator for generating a phase modulated signal comprised of a carrier frequency signal modulated with a PN code sequence;

means, coupled to said biphase modulator, for measuring power of a center spectral component of said phase modulated signal;

means for comparing said center spectral component with a reference power signal; and means, responsive to said means for comparing, for generating a control signal for adjusting a parameter of said biphase modulator thereby achieving a desired power spectrum of said phase modulated signal and improving autocorrelation of the PN coded system.

8. The system according to claim 7 wherein said means for generating a control signal includes means for adjusting a relative phase difference between the two states of said biphase modulated signal.

9. The system according to claim 7 wherein said means for generating a control signal includes means for adjusting a relative amplitude ratio between the two states of said biphase modulated signal.

10. The system according to claim 7 further including a down converter for converting said phase modulated signal to a baseband signal.

11. The system according to claim 7 further including means for obtaining a measure of power of at least one spectral component of said biphase modulated signal that is adjacent to said center spectral component and wherein said reference power signal includes power measured in said at least one spectral component.

12. A control loop for improving autocorrelation in pseudorandom noise (PN) coded system, comprising:

a biphase modulator for generating a phase modulated signal comprised of a carrier frequency signal modulated with a PN code sequence; and a control signal generator, responsive to said phase modulated signal, for measuring a magnitude of a center spectral component of said phase modulated signal and for supplying an adjustable control signal to said biphase modulator for maintaining a predetermined magnitude of said center spectral component and for improving autocorrelation of the PN coded system.

13. The control loop of claim 12 wherein said adjustable control signal is utilized for adjusting a relative amplitude ratio of said phase modulated signal.

14. The control loop of claim 13 wherein a relative phase difference of said phase modulated signal is fixed to a predetermined value.

15. The control loop of claim 12 wherein said adjustable control signal is utilized for adjusting a relative phase difference of said phase modulated signal.

16. The control loop of claim 15 wherein a relative amplitude ratio of said phase modulated signal is fixed to a predetermined value.

17. The control loop of claim 12 wherein said control signal generator includes means for measuring a magnitude of at least one spectral component of said phase modulated signal that is adjacent to said center spectral component and wherein a value of said adjustable control signal is a function of the magnitudes of said center spectral component and said at least one spectral component.

18. The control loop of claim 12 further including a down converter for converting said phase modulated signal to a baseband signal.

19. The control loop of claim 18 wherein said control signal generator includes:

means for filtering in-phase and quadrature components of said baseband signal;

means for digitizing said filtered in-phase and quadrature components of said baseband signal; and means for obtaining a discrete Fourier transform of said digitized in-phase and quadrature components of said baseband signal for use in obtaining said magnitude of said center spectral component of said phase modulated signal.

* * * * *